(12) United States Patent
Huff et al.

(10) Patent No.: US 6,668,972 B2
(45) Date of Patent: Dec. 30, 2003

(54) BUMPER/MUFFLER ASSEMBLY

(75) Inventors: Norman T. Huff, Newark, OH (US); Robert A. Schweizer, Granville, OH (US); Andrew M. Sanders, Great Wakering (GB)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/992,254

(22) Filed: Nov. 6, 2001

(65) Prior Publication Data

US 2002/0079162 A1 Jun. 27, 2002

Related U.S. Application Data (60) Provisional application No. 60/264,634, filed on Jan. 26, 2001, and provisional application No. 60/246,398, filed on Nov. 7, 2000.

(51) Int. Cl.⁷ .................................................. F01N 1/24
(52) U.S. Cl. ..................... 181/256; 181/228; 181/244; 181/248; 181/255; 181/282
(58) Field of Search ............................... 181/256, 282, 181/212, 228, 244, 248, 258

(56) References Cited

U.S. PATENT DOCUMENTS

| | | |
|---|---|---|
| 2,658,580 A | 11/1953 | Trembley |
| 2,992,035 A | 7/1961 | Tell et al. |
| 3,921,273 A | 11/1975 | Kondo et al. |
| 4,362,016 A * | 12/1982 | Papadopulos ............... 60/297 |
| 4,565,260 A | 1/1986 | Scheidt et al. |
| 4,569,471 A | 2/1986 | Ingemansson et al. |
| 4,589,516 A * | 5/1986 | Inoue et al. ............... 181/256 |
| RE32,258 E | 10/1986 | Kondo et al. |
| 4,774,985 A | 10/1988 | Broadbelt et al. |
| 4,916,003 A * | 4/1990 | Le Sech et al. ............. 428/174 |
| 4,993,513 A | 2/1991 | Inoue et al. |
| 5,036,585 A | 8/1991 | Schweinfurth |
| 5,096,010 A | 3/1992 | Ojala et al. |
| 5,114,184 A | 5/1992 | Shimomura et al. |
| 5,340,952 A | 8/1994 | Takiguchi |
| 5,398,407 A | 3/1995 | Stuer |
| 5,461,777 A | 10/1995 | Ikeda et al. |
| 5,468,923 A | 11/1995 | Kleyn |
| 5,477,015 A | 12/1995 | Preslicka et al. |
| 5,479,706 A | 1/1996 | Tamano et al. |
| 5,660,134 A | 8/1997 | Kim |
| 5,726,398 A | 3/1998 | Zahn et al. |
| 5,766,541 A | 6/1998 | Knutsson et al. |
| 5,784,784 A | 7/1998 | Flanigan et al. |
| 5,806,899 A * | 9/1998 | Norikawa et al. .......... 285/299 |
| 5,859,394 A | 1/1999 | Seehaus et al. |
| 5,907,904 A | 6/1999 | Gerber et al. |
| 5,976,453 A | 11/1999 | Nilsson et al. |
| 6,053,276 A | 4/2000 | D'Amico, Jr. et al. |
| 6,068,082 A | 5/2000 | D'Amico, Jr. et al. |
| 6,094,817 A | 8/2000 | Shah et al. |
| 6,148,519 A | 11/2000 | Stenersen et al. |
| 6,158,547 A | 12/2000 | Ackermann et al. |
| 6,308,799 B1 * | 10/2001 | Konstantakopoulos ...... 181/282 |

FOREIGN PATENT DOCUMENTS

| | | |
|---|---|---|
| DE | 68 901 487 | 6/1992 |
| EP | 0377 877 | 10/1989 |
| EP | 1114919 | 12/2000 |
| ES | 2031374 | 12/1992 |
| FR | 2629864 | 10/1989 |
| JP | 4203308 | * 7/1992 |
| JP | 6146844 | * 5/1994 |
| WO | WO 99/27238 | 6/1999 |

* cited by examiner

Primary Examiner—Shih-Yung Hsieh
(74) Attorney, Agent, or Firm—Inger H. Eckert; James J. Dottavio

(57) ABSTRACT

A bumper/muffler assembly is provided comprising a bumper; and a muffler having an outer shell. The outer shell may be formed from a non-high impact resistant material, such as a thin metal or a composite material. The muffler may comprise a separate element from the bumper, which is coupled thereto, or is formed as an integral part of the bumper.

32 Claims, 5 Drawing Sheets

BUMPER/MUFFLER ASSEMBLY

RELATED APPLICATIONS

This application claims the priority of Provisional Application U.S. Ser. No. 60/246,398, filed Nov. 7, 2000, entitled BUMPER/MUFFLER ASSEMBLY and Provisional Application U.S. Ser. No. 60/264,634 filed Jan. 26, 2001, entitled BUMPER/MUFFLER ASSEMBLY, both by Norman Thomas Huff et al., the disclosures of which are incorporated herein by reference.

TECHNICAL FIELD AND INDUSTRIAL APPLICABILITY OF THE INVENTION

This invention relates to a bumper/muffler assembly wherein a muffler, preferably made from a composite material, is associated with a vehicle bumper.

BACKGROUND OF THE INVENTION

U.S. Pat. No. 5,726,398 to Zahn et al. discloses a bumper/muffler assembly. A portion of the structure defining the muffler also forms part of the bumper and, hence, must be capable of absorbing high impact loads. If, after a certain period of vehicle operation, the muffler becomes defective and must be replaced, those defective parts must be replaced with costly parts capable of performing dual functions—attenuate acoustic energy and absorb high impact loads. The '398 patent also teaches that the bumper/muffler assembly may be formed from metal, see column 2, line 41. There are inherent limitations from a design standpoint regarding possible shapes and sizes for metal mufflers. Hence, the ability to design mufflers capable of being received in irregularly shaped vehicle recesses or cavities is restricted. It is also noted that the tooling costs for metal mufflers is very high, which is problematic where only a limited number of mufflers are to be produced, e.g., less than 100,000.

Published International Application WO 99/27238 discloses a silencer formed from a composite material, such as a glass filled nylon (nylon 66). It does not, however, teach incorporating such a device into a vehicle bumper.

Hence, there is a need for an improved, low-cost muffler, which is capable of being associated with a vehicle bumper. Preferably, the muffler is made from a lightweight material, not required to absorb high impact loads.

SUMMARY OF THE INVENTION

These needs are met by the present invention, wherein improved bumper/muffler assemblies are provided. In these assemblies, the muffler outer shell may be formed from a lightweight metal or a composite material. Such materials are typically less expensive than thicker metals designed to also absorb high impact loads. Composite outer shells are further advantageous as tooling costs for such parts are typically lower than for metal parts. Furthermore, composite outer shells can be more easily designed and formed into intricate shapes and sizes so as to be received in irregularly shaped vehicle recesses and cavities.

In accordance with a first aspect of the present invention, a bumper/muffler assembly is provided comprising a bumper, and a muffler having an outer shell formed from a composite material. The muffler is associated with the bumper. That is, the muffler is a separate element from the bumper but is coupled thereto or is formed as an integral part of the bumper. The perforated pipe may include openings formed by completely removing small metal portions from the pipe. Alternatively, the perforated pipe may comprise a louvered pipe, wherein the openings are formed by cutting and subsequently bending small sections of the pipe outwardly. The bent sections typically remain attached to the pipe.

The muffler further comprises a perforated pipe for receiving exhaust gases, and fibrous material provided within the outer shell between the perforated pipe and the outer shell. The muffler shell may comprise a single or multi-piece outer shell. For example, the muffler shell may comprise first and second shell parts.

The fibrous material may comprise first and second fibrous material preforms which are received respectfully in the first and second shell parts. Alternatively, the fibrous material may comprise a loose or bagged fluffed-up, wool-type product provided within an internal cavity of the outer shell. It is also contemplated that the fibrous material may comprise a mat product wrapped about the perforated pipe or otherwise filling the internal cavity of the outer shell.

The bumper/muffler assembly may further comprise a heat shield positioned between the bumper and the muffler outer shell and/or between the bumper and an exhaust pipe. It may also comprise at least one bushing for holding a portion of the perforated pipe within the outer shell. The assembly may additionally comprise a cover for securing the muffler to the bumper.

The bumper may comprise a main body having front, rear, upper and lower surfaces. The front surface faces away from a vehicle. The rear surface faces toward the vehicle. The upper surface faces away from ground and the lower surface faces toward ground. The main body further includes a recess formed in the rear surface and one of the upper or lower surfaces for receiving the muffler shell such that the main body provides impact protection for the muffler shell. A portion of the main body may define at least a part of an outer shell of the muffler.

In accordance with a second aspect of the present invention, a bumper/muffler/exhaust pipe system is provided comprising a bumper/muffler assembly, at least one exhaust pipe and a flex section. The bumper/muffler assembly includes a muffler having an outer shell and a perforated pipe extending through the outer shell. The muffler is associated with the bumper. The flex section couples the exhaust pipe to the perforated pipe.

The flex section may be welded, clamped or otherwise coupled to the exhaust pipe.

The bumper/muffler/exhaust pipe system may further comprise a bushing having an outer surface engaging the outer shell and an inner surface engaging the flex section. The flex section may extend only part way through the bushing such that it abuts the perforated pipe. It is also contemplated that the flex section may extend completely through the bushing.

The flex section may comprise a flexible woven metal tube.

In accordance with a third aspect of the present invention, a bumper/muffler assembly is provided comprising a bumper, and a muffler. The muffler is associated with the bumper and includes an outer shell and a perforated pipe with opposing ends. The perforated pipe extends through the outer shell. At least one bushing assembly is positioned between the outer shell and the perforated pipe. The bushing assembly includes a first bushing having an angled outer surface. The first bushing is fixedly coupled to the perforated pipe. The bushing assembly further includes a second bushing having an angled inner surface and is positioned over the first bushing. The second bushing engages an inner surface of the outer shell and is capable of moving relative to the first bushing and the outer shell. A spring is fixedly coupled to the perforated pipe and engages an inner, side surface of the second bushing for biasing the second bushing outwardly toward a corresponding end of the perforated pipe.

In accordance with a fourth aspect of the present invention, a bumper/muffler assembly is provided comprising a bumper, and a muffler having an outer shell formed from a non-high impact resistant material. The muffler is associated with the bumper. The outer shell does not comprise a high impact-resistant structural component of the bumper.

DETAILED DESCRIPTION AND PREFERRED EMBODIMENTS OF THE INVENTION

The present invention is directed to a muffler which is associated with a vehicle bumper. For example, the muffler may be mounted to a vehicle bumper, preferably on the backside of a rear bumper (i.e., between the bumper and the car body), such that the muffler is protected from impact damage by the bumper and also by virtue of it not being a part of the vehicle with the least or nearly least clearance from the ground. Because the muffler is not subjected to high impact loads, the shell of the muffler can be formed from materials that do not have high impact resistant properties, such as some phenolic resins, examples noted below, and thin metals, e.g., stainless steels having a thickness less than about 1.5 mm. Further, the muffler may be longer than conventional mufflers, e.g., it may have a length up to almost the length of the bumper, e.g., greater than 60 inches, such that the muffler operates more efficiently, especially in dissipating low frequency acoustic energy.

Figure 1:
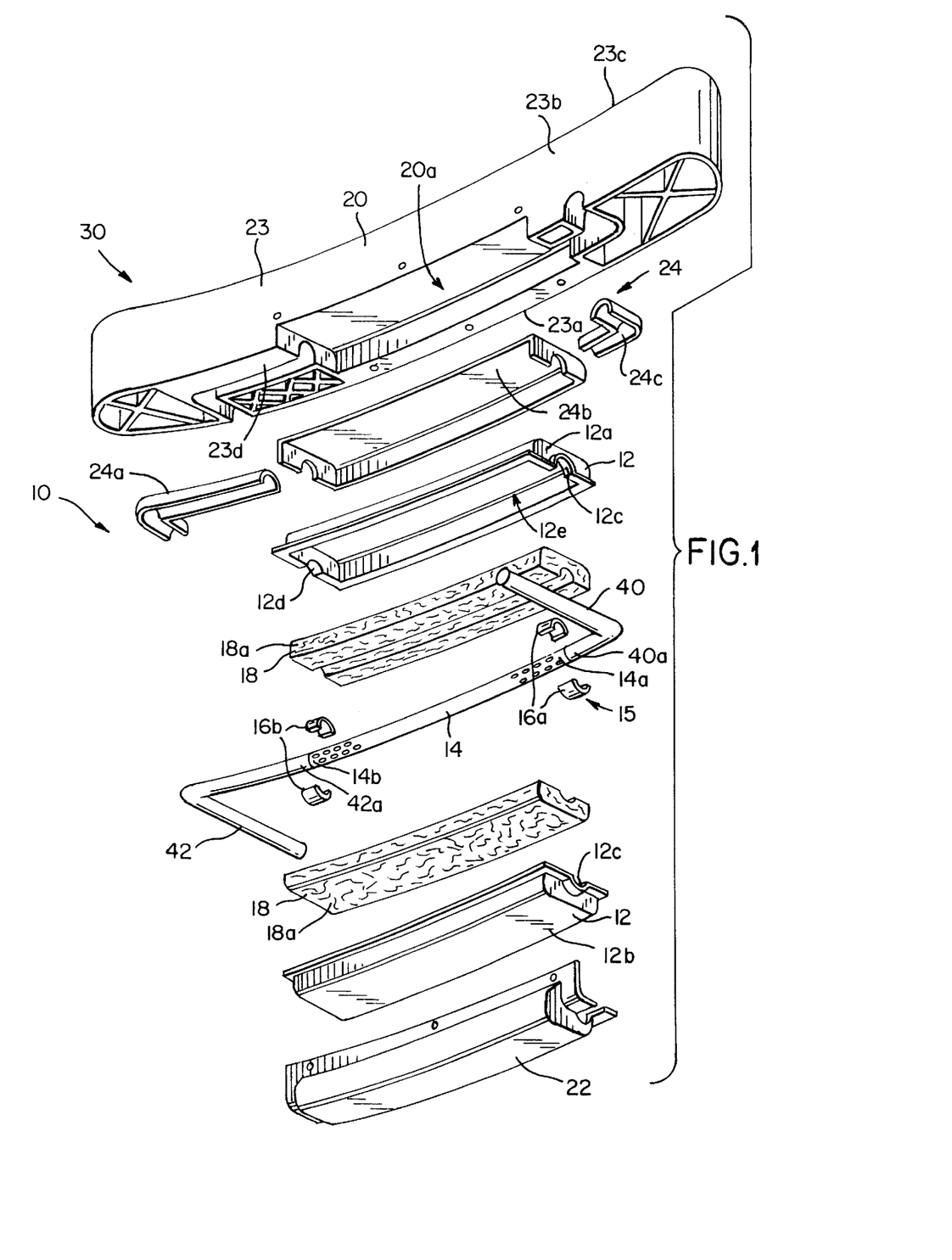
FIG. 1 is an exploded, perspective view of a bumper/muffler assembly constructed in accordance with a first embodiment of the present invention.

Referring now to FIG. 1, which is an exploded view illustrating a muffler 10, constructed in accordance with a first embodiment of the present invention, and a vehicle bumper 20. When those two elements are assembled together, they define a bumper/muffler assembly 30.

The muffler 10 comprises a rigid outer shell 12 defined by first and second shell parts 12a and 12b. The shell parts 12a and 12b are formed from a metal, a resin or a composite material comprising, for example, reinforcement fibers and a resin material. When formed from a composite material, the resin material may comprise any commercially available phenolic resin, including but not limited to phenolformaldehyde resins such as novolac and resole resins; epoxy resins; vinyl ester resins; polyphenylene sulfide; high temperature nylons, one of which is commercially available from E.I. Du Pont de Nemours and Co. under the product designation "Zytel HTN", and another of which is commercially available from Amoco Performance Products, Inc. as polythalamide and sold under the product designation "Amodel"; nylon 6,6, one of which is commercially available from E.I. Du Pont de Nemours and Co. under the product designation "Zytel"; and polyetheretherketone (PEEK). The reinforcement fibers forming part of the outer shell 12 may comprise glass fibers (such as but not limited to E-glass and S-2 glass fibers), graphite fibers, aramid fibers such as those sold under the trademark KEVLAR®, carbon fibers, metallic fibers and/or ceramic fibers. The composite shell parts 12a and 12b may be formed using a conventional injection molding or compression molding process wherein the reinforcement fibers and resin are combined prior to being injected or placed into the mold, or may be formed using any other known process for forming such parts. It is also contemplated that the shell 12 could be formed as a one piece shell via a blow molding, injection molding, compression molding, vacuum forming, squeeze molding, thermoforming or like process.

Extending through the outer shell 12 is a perforated metal pipe 14 formed, for example, from a stainless steel. In the illustrated embodiment, the perforated pipe 14 is frictionally held within the outer shell 12 via first and second bushings 16a and 16b. As noted above, the rigid outer shell 12 may be formed from a metal, a resin or a composite material. In FIG. 1, the bushings 16a and 16b are illustrated as two-component bushings. However, each bushing 16a and 16b may comprise a single, annular element formed from a ceramic material such as zirconia or a stabilized or modified zirconia or a high temperature polymer such as polytetraflouroethylene sold by E.I. Du Pont de Nemours and Co. under the product designation "TEFLON®", see International Application WO 99/27238A1, the disclosure of which is incorporated herein by reference; polyimide, sold by E.I. Du Pont de Nemours and Co. under the product designation "Vespel"; polyketone, sold by Amoco Performance Products, Inc. under the product designation "Kadel"; polyetheretherketone, sold by Victrex USA Inc. under the product designation "PEEK"; polyetherketone, sold by Victrex USA, Inc. under the product designation "PEK"; polyamide imide, sold by Amoco Performance Products, Inc., under the product designation "Torlon"; and a liquid crystal polymer sold by Amoco Performance Products, Inc. under the product a designation "Xydar." If a two-component bushing is used, clamps may be used to secure the bushings on opposing ends 14a and 14b of the perforated pipe 14. If single element bushings are used, their inner diameters may be sized so as to permit opposing ends 14a and 14b of the pipe 14 to be press-fitted into the bushings 16a and 16b. When the pipe ends 14a and 14b are press-fitted into the bushings 16a and 16b, the pipe 14 and the bushings 16a and 16b define a pipe/bushing assembly 15.

The bushings 16a and 16b may have an outer diameter sized to permit the bushings 16a and 16b to be press-fitted into or frictionally held by entry portions 12c and 12d of an inner cavity section 12e of the outer shell 12. The bushings 16a and 16b are preferably first press-fitted over the ends 14a and 14b of the pipe 14 prior to the pipe/bushing assembly 15 being assembled with the outer shell 12. The pipe/bushing assembly 15 may be placed within an inner cavity portion of one of the shell parts 12a or 12b prior to the shell parts 12a and 12b being coupled to one another or the assembly 15 may be assembled to the shell 12 after the shell parts 12a and 12b are coupled together. The shell parts 12a and 12b may be coupled to one another via clamps (not shown), via integral connectors which mate with one another, e.g., first connectors forming part of one shell part which are press-fitted within receiving cavities provided in second connectors forming part of the other shell part, via a crimping or welding operation, or via an adhesive.

Provided within the outer shell 12 and positioned between the pipe 14 and the shell 12 is fibrous material 18. The fibrous material 18 may be formed from one or more continuous glass filament strands, wherein each strand comprises a plurality of filaments which are separated or texturized via pressurized air so as to form a loose wool-type product in the outer shell 12, see U.S. Pat. Nos. 5,976,453 and 4,569,471, the disclosures of which are incorporated herein by reference. The filaments may be formed from, for example, E-glass or S-glass, or other glass compositions. The continuous strand material may comprise an E-glass roving sold by Owens Corning under the trademark ADVANTEX® or an S-glass roving sold by Owens Coming under the trademark ZenTron®.

It is also contemplated that ceramic fiber material may be used instead of glass fibrous material to fill the outer shell 12. Ceramic fibers, if continuous, could be filled directly into the shell or used to form a preform which is subsequently placed in the shell 12. It is also contemplated that preforms may be made from a discontinuous glass fiber product produced via a rock wool process or a spinner process used to make fiber glass used as thermal insulation in residential and commercial applications. It is further contemplated that stainless steel could be wrapped about the perforated pipe 14 or made into a cylindrical preform and then slipped over the pipe 14 prior to the pipe 14 being inserted into the outer shell. It is additionally contemplated that an E-glass needle felt mat, made into a cylindrical preform, could be slipped over the perforated pipe 14. A layer of stainless steel could be provided between the needle felt mat preform and the perforated pipe 14.

In the illustrated embodiment, continuous glass strands have been texturized and formed into a pair of preforms 18a. Each preform 18a is placed in one of the shell parts 12a or 12b prior to the shell parts 12a and 12b being coupled together. Processes and apparatus for forming such preforms are disclosed in U.S. Pat. Nos. 5,766,541 and 5,976,453, the disclosures of which are incorporated herein by reference; and in patent application, U.S. Ser. No. 08/802,492, the disclosure of which is also incorporated herein by reference.

Acoustic energy passes through the perforated pipe 14 to the fibrous material 18 which functions to dissipate the acoustic energy. The fibrous material 18 also functions to thermally protect or insulate the outer shell 12 from energy in the form of heat transferred from high temperature exhaust gases passing through the pipe 14.

It is also contemplated that the fibrous material 18 may be filled into bags made from plastic sheets or glass mesh and subsequently placed into the shell parts 12a and 12b, see U.S. Pat. No. 6,068,082, and co-pending application, U.S. Ser. No. 09/952,004, filed Sep. 12, 2001 and entitled "MUFFLER SHELL FILLING PROCESS AND MUFFLER FILLED WITH FIBROUS MATERIAL," by Luc Brandt et al., the disclosures of which are incorporated herein by reference. It is additionally contemplated that the fibrous material 18 may be inserted into the outer shell 12 via any one of the processes disclosed in co-pending applications: U.S. Ser. No. 09/811,222, filed Mar. 16, 2001 and entitled "PROCESS FOR FILLING A MUFFLER SHELL WITH FIBROUS MATERIAL"; U.S. Ser. No. 09/775,759, filed Feb. 1, 2001 and entitled "PROCESS FOR FILLING A MUFFLER AND MUFFLER FILLED WITH FIBROUS MATERIAL"; and U.S. Ser. No. 09/945,074, filed Aug. 31, 2001 and entitled "MUFFLER SHELL FILLING PROCESS, MUFFLER FILLED WITH FIBROUS MATERIAL AND VACUUM FILLING DEVICE," the disclosures of which are incorporated herein by reference.

It is further contemplated that the one or more continuous glass filament strands may be fed into an opening (not shown) formed in the outer shell 12 after the shell parts 12a and 12b have been coupled together along with pressurized air such that the fibers forming the roving separate from one another and expand within the outer shell 12 to form a "fluffed-up" or wool-type product within the outer shell 12. Processes and apparatuses for texturizing glass strand material which is fed into a muffler shell are set out in U.S. Pat. Nos. 4,569,471 and 5,976,453, the disclosures of which are incorporated herein by reference.

It is additionally contemplated that the pipe 14 may be positioned within the shell 12 prior to the bushings 16a and 16b being press-fitted onto the ends 14a and 14b of the pipe 14. In this embodiment, one or more glass filament strands may be fed between the shell 12 and the pipe 14 prior to the bushings 16a and 16b being press-fitted onto the pipe ends.

The outer shell 12, the perforated pipe 14, the bushings 16a and 16b and the strand material define the muffler 10.

The bumper 20 comprises a main body 23 having a front surface 23a, a rear surface 23b, an upper surface 23c and a lower surface 23d. The front surface 23a faces away from a vehicle to which the bumper 20 is coupled. The rear surface 23b faces toward the vehicle. The upper surface 23c faces away from ground and the lower surface 24d faces toward ground. The main body 23 further includes a recess 20a formed in the rear and lower surfaces 23b and 23d for receiving the muffler shell 12 such that the main body 23 provides impact protection for the muffler shell 12.

A cover 22 is bolted or otherwise coupled to the bumper 20 so as to secure the muffler 10 to the bumper 20 as well as to provide additional impact protection for the muffler 10. The bumper 20 is typically formed from a composite material, i.e., resin material and reinforcement fibers. The bumper 20 may also comprise a metal frame encased in a polymeric or composite material shell. The cover 22 may be formed from a composite material. The cover 22 may also be formed from a metal so as to provide a means to transfer heat generated by the muffler 10 away from the muffler 10, to reduce costs and to enhance the strength of the cover 22 and the bumper 20. It is also contemplated that the outer shell 12 may be shaped and provided with appropriate openings for receiving bolts such that a separate cover is not required. In this embodiment, the outer shell is bolted or otherwise fastened directly to the bumper 20.

It is contemplated that a heat shield formed from a metal or another material such as a foamed inorganic material and acting as a heat insulator could be provided between the muffler 10, portions of exhaust pipes 40 and 42 and any resin based component in the bumper 20. However, the fibrous material 18 in the muffler 10 may be sufficient to keep the temperature of the muffler outer shell 12 cool enough that the bumper 20 itself would not need to be thermally protected from the muffler 10. It is likely, though, that the bumper 20 may need to be thermally protected from the exhaust pipes 40 and 42. In the illustrated embodiment, a heat shield 24 comprising first, second and third sections 24a–24c is provided. Section 24b is provided between the muffler 10 and bumper 20, see FIG. 1. Sections 24a and 24c are positioned between the bumper 20 and portions of the pipes 40 and 42, discussed below, coupled to the perforated pipe 14 and positioned near the bumper 20 so as to shield the bumper 20 from excessive energy in the form of heat emanating from the pipes 40 and 42. It is also contemplated that the heat shield 24 may only comprise sections 24a and 24c. In such an implementation, it is assumed that the muffler 10 restricts the flow of heat a sufficient amount such that a heat shield section is not required to be positioned between the muffler 10 and the bumper 20. It is additionally contemplated that a heat shield may not be required at all.

While not illustrated, it is contemplated that louvers may be provided in the bumper 20 to enhance airflow around the muffler 10 so as to aid in the dissipation of heat from the muffler 10. It is also contemplated that fins (not shown) may project from the muffler 10 for heat dissipation.

Figure 1A:
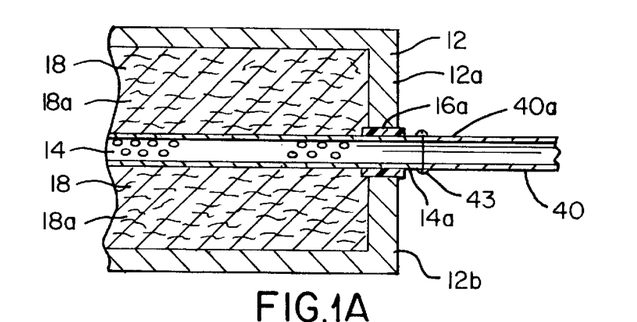
FIG. 1A is a cross-sectional view of a first arrangement for coupling an exhaust pipe to a perforated pipe.

First and second exhaust pipes 40 and 42 are coupled to the opposing ends 14a and 14b of the perforated pipe 14. In a first embodiment, the ends 14a and 14b of the perforated pipe 14 extend completely through the bushings 16a and 16b and are welded to the ends 40a and 42a of the exhaust pipes 40 and 42 at locations spaced from the outer shell 12, see FIG. 1A where only bushing 16a, perforated pipe end 14a and exhaust pipe end 40a are shown. A weld bead 43 is shown in FIG. 1A spaced from the outer shell 12. In this embodiment, the bushings 16a and 16b are preferably formed from a polymeric material, but it is also contemplated that a ceramic material may be used as well. The rigid outer shell 12 may be formed from a metal, a resin or a composite material.

In a first alternative embodiment, ends 14a and 14b of the perforated pipe 14 extend only part way through the bushings 16a and 16b. Further, ends 40a and 42a of the first and second pipes 40 and 42 are press-fitted into the bushings 16a and 16b. The pipe ends 40a and 42a may abut the pipe ends 14a and 14b already positioned within the bushings 16a and 16b. In this embodiment, it is also preferred that the bushings 16a and 16b be formed from a polymeric material. The rigid outer shell 12 in this embodiment may also be formed from a metal, a resin or a composite material.

Figures 1B, 1C, 1D, 1E, 1F:
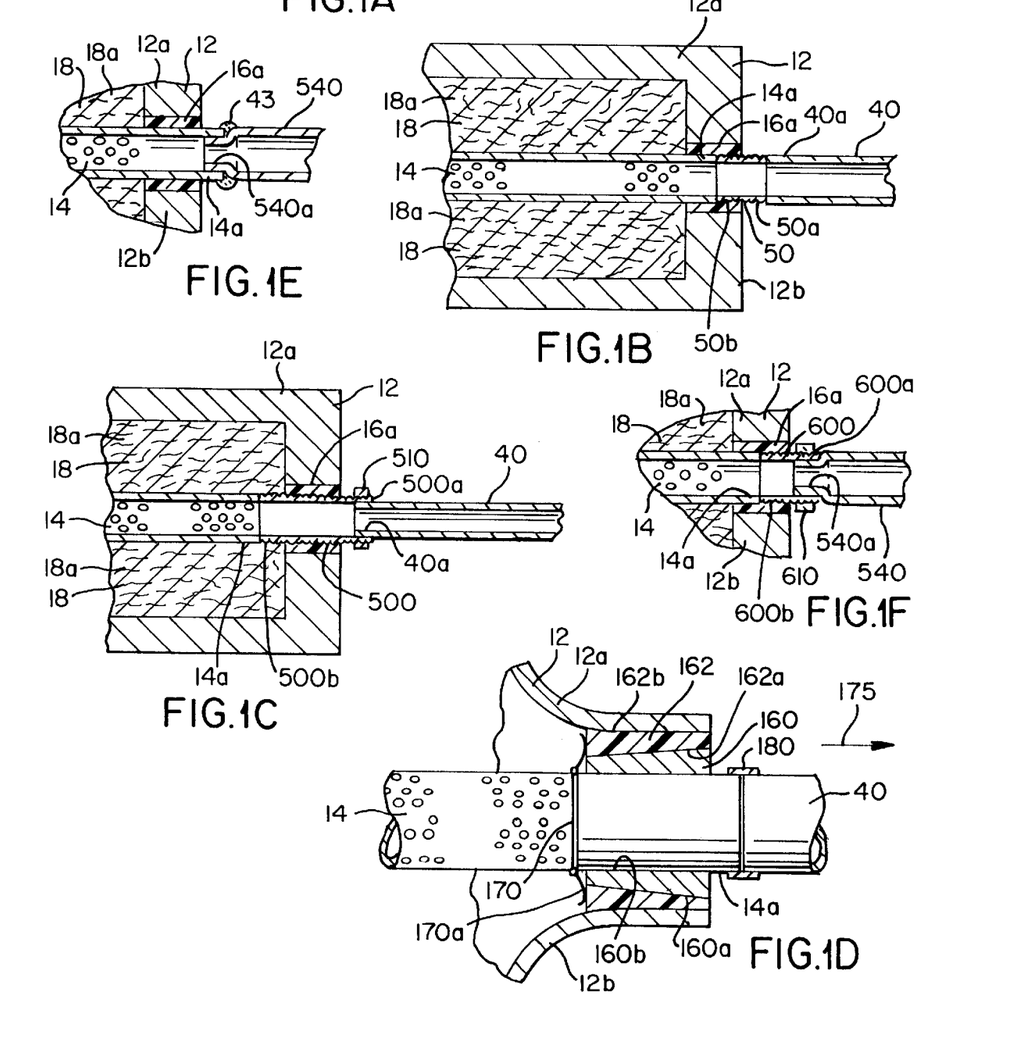
FIG. 1B is a cross-sectional view of a second alternative arrangement for coupling an exhaust pipe to a perforated pipe.
FIG. 1C is a cross-sectional view of a third alternative arrangement for coupling an exhaust pipe to a perforated pipe.
FIG. 1D is a cross-sectional view of a bushing assembly for mounting an end of a perforated pipe in an outer shell of a muffler.
FIG. 1E is a cross-sectional view of a fifth alternative arrangement for coupling an exhaust pipe to a perforated pipe.
FIG. 1F is a cross-sectional view of a sixth alternative arrangement for coupling an exhaust pipe to a perforated pipe.

In a second alternative embodiment, the first and second exhaust pipes 40 and 42 are coupled to the opposing ends 14a and 14b of the perforated pipe 14 via the bushings 16a and 16b and first and second flex pipe sections 50, only one of which is shown in FIG. 1B. The flex pipe sections 50 comprise flexible woven steel tubes and are commercially available from Selflex Company, Ltd. (http://www.selflex.com/ddjjkang/main3.html); Exhaust Products Inc., Merrillville, Ind. (http://www.epiflex.com); Magna-Flow Performance Exhaust, Calif. (http://www.magnaflow.com); and JMB Muffler http://www.jmb-muffler.com/. A first end 50a of each flex pipe section 50 is welded or otherwise secured to an end portion (only end portion 40a is illustrated in FIG. 1B) of a corresponding exhaust pipe 40 or 42. The opposing end 50b of the flex pipe section is press-fitted into its corresponding bushing 16a and 16b and may extend part way through the bushing along with a corresponding end of the perforated pipe 14 so as to be coupled to the perforated pipe 14. The rigid outer shell 12 in this embodiment may be formed from a metal, a resin or a composite material.

Alternatively, a slip joint connection may be substituted for such flex pipe sections. A slip joint is advantageous as it compensates for expansion of an exhaust pipe extending from a vehicle catalytic converter and coupled via a slip joint to the perforated pipe 14.

In a third alternative embodiment illustrated in FIG. 1C, where like elements are referenced by like reference numerals, flex pipe sections 500, only one of which is shown in FIG. 1C, are used to couple the perforated pipe 14 to the first and second exhaust pipes 40 and 42. The flex pipe sections 500 comprise flexible steel tubes and are commercially available from any one of the suppliers set out above from which the flex pipe sections 50 are available. In this embodiment, a first end 500a of each flex pipe section 500 is fitted over an end 40a or 42a of its corresponding exhaust pipe 40 or 42 and clamped thereon via a clamp 510. It is also contemplated that the first end 500a could be welded, brazed or otherwise coupled to an exhaust pipe end. In the illustrated embodiment, the second end 500b of each flex pipe section 500 is welded to an end of the perforated pipe 14. It is also contemplated that each second end 500b could be clamped or otherwise coupled to an end of the perforated pipe 14. The rigid outer shell 12 in the FIG. 1C embodiment may be formed from a metal, a resin or a composite material.

If the bushings 16a and 16b in the second and third alternative embodiments are formed from a ceramic material, it is contemplated that a layer of ceramic fibers may be interposed between the bushings 16a and 16b and the flex pipe sections 50, 500 so as to prevent exhaust gases from passing between the flex pipe sections 50, 500 and the bushings 16a and 16b. The ceramic fiber layer may comprise a ceramic tape or mat (not shown), having a thickness of about 1 mm. The tape or mat may be adhesively coupled to the inner surface of each ceramic bushing via an adhesive so as to hold the tape or mat in place as a flex pipe section is press-fitted into place within its corresponding bushing.

If an end portion of an exhaust pipe 40 or 42 is press-fitted directly into one of the ceramic bushings 40 or 42, upon being heated, it will place the ceramic bushing in a state of tension causing the bushing to be susceptible to fracture. This occurs when the pipe end expands to a greater extent as it is heated than the ceramic bushing. The flex pipe sections 50, 500 supply enough motion flexibility when heated such that the ceramic bushings are not placed in high tension due to the difference in thermal expansion of the ceramic material and the metal from which the flex pipe sections are formed.

In a fourth alternative embodiment illustrated in FIG. 1D, where like elements are referenced by like reference numerals, a first bushing 160, formed from a metal, such as stainless steel, is press-fitted, adhesively coupled, brazed or welded onto each end 14a and 14b of the perforated pipe 14. A second bushing 162, which was previously slipped over an end 14a or 14b of the perforated pipe 14 prior to the first bushings 160 being fitted over the ends 14a and 14b, is slipped over each of the first bushings 160. The second bushings 162 can be formed from zirconia, a stabilized or modified zirconia or a like ceramic material. As is apparent from FIG. 1D, the outer surface 160a of each first bushing 160 is angled or tapered relative to its inner surface 160b, while an inner surface 162a of each second bushing 162 is angled or tapered relative to its outer surface 162b. The angle of each tapered outer surface 160a is substantially equal to but opposite to the angle of an adjacent tapered inner surface 162a.

A flex spring 170 (only one spring is illustrated in FIG. 1D) is fitted over each end portion of the perforated pipe 14 and spot-welded in place on the pipe 14. One such spring may comprise a conventional belville washer. A flex arm 170a of each spring 170 applies a biasing force against its corresponding second bushing 162 causing the second bushing 162 to move in a direction away from a center portion of the perforated pipe 14 so as to form a first gas tight seal between the outer surface of the bushing 162 and an inner surface of the outer shell 12 and a second gas tight seal at the interface between the first and second bushings 160 and 162. For the bushing 162 at end 14a, it is biased by its spring 170 in a direction indicated by action arrow 175 in FIG. 1D.

As the perforated pipe 14 heats up and cools down, it expands and contracts radially and axially. Radial expansion results in each first bushing 160 pushing its corresponding second bushing 162 in a direction toward the center of the perforated pipe 14 and against the biasing force of its associated spring 170. Because the second bushing 162 can move axially as the first bushing 160 expands radially, the second bushing 162 is not placed in a high-tension state due to radial expansion of the first bushing 160. Radial contraction results in the second bushing 162 moving under the influence of the spring 170 in a direction away from the center portion of the perforated pipe 14 due to the first bushing 160 moving or contracting away from the second bushing 162. Axial expansion and contraction of the perforated pipe 14 results in the first and second bushings 160 and 162 moving substantially together, i.e., like amounts.

In the illustrated embodiment, the exhaust pipes 40 and 42 are clamped via clamps 180 to ends 14a and 14b of the perforated pipe 14 at locations outside of the outer shell 12. The pipes 40 and 42 may also be welded to the pipe ends 14a and 14b. The rigid outer shell 12 in the FIG. 1D embodiment may be formed from a metal, a resin or a composite material.

In a fifth alternative embodiment, illustrated in FIG. 1E, where like elements are referenced by like reference numerals, first and second exhaust pipes (only first exhaust pipe 540 is illustrated) are coupled to opposing ends 14a and 14b of the perforated pipe 14. The ends 14a and 14b of the perforated pipe 14 extend completely through the bushings 16a and 16b. Crimped ends of the exhaust pipes (only crimped end 540a of first exhaust pipe 540 is illustrated) are inserted into open ends of the perforated pipe 14 and are welded to the perforated pipe ends at locations spaced from the outer shell 12, see weld bead 43 shown in FIG. 1E. In this embodiment, the bushings 16a and 16b are preferably formed from a polymeric material, but it is also contemplated that a ceramic material may be used as well. The rigid outer shell 12 may be formed from a metal, a resin or a composite material.

In a sixth alternative embodiment, illustrated in FIG. 1F, where like elements are referenced by like reference numerals, first and second exhaust pipes (only exhaust pipe 540 is illustrated) are coupled to the opposing ends 14a and 14b of the perforated pipe 14 via the bushings 16a and 16b and first and second flex pipe sections 600, only one of which is shown in FIG. 1F. The flex pipe sections 600 comprise flexible steel tubes and are commercially available from any one of the suppliers set out above from which the flex pipe sections 50 are available. In this embodiment, a crimped end of each first and second exhaust pipe (only crimped end 540a of the first exhaust pipe 540 is illustrated) is inserted into a first end 600a of a corresponding flex pipe section 600. The flex pipe section first end 600a is then clamped to its corresponding exhaust pipe via a clamp 610. It is also contemplated that the first end 600a could be welded, brazed or otherwise coupled to an exhaust pipe end. In the illustrated embodiment, the second end 600b of each flex pipe section 600 is welded to an end of the perforated pipe 14. It is also contemplated that each second end 600b could be clamped or otherwise coupled to an end of the perforated pipe 14. The rigid outer shell 12 in the FIG. 1F embodiment may be formed from a metal, a resin or a composite material.

Figure 2:
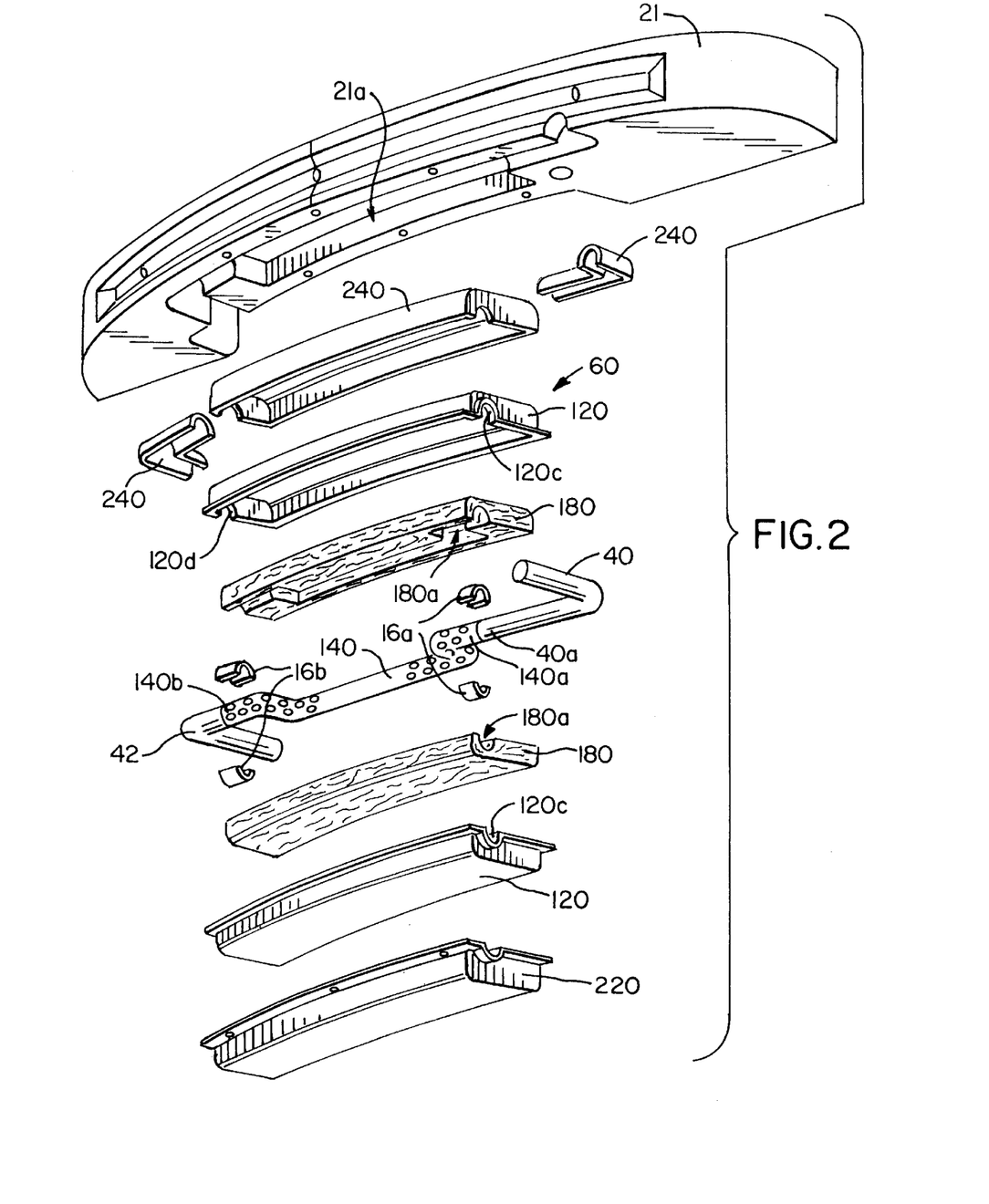
FIG. 2 is an exploded, perspective view of a bumper/muffler assembly constructed in accordance with a second embodiment of the present invention.

A muffler 60, configured in accordance with a second embodiment of the present invention, is illustrated in FIG. 2, wherein like reference numerals indicate like elements. In this embodiment, the perforated pipe 140 has L-shaped end portions 140a and 140b and the cover 220 has a generally rectangular shape. The pipe receiving inner cavities 180a of the fibrous glass material preforms 180 are shaped so as to receive the pipe 140. Further, the entry portions 120c and 120d of outer shell 120 are located appropriately so as to be capable of accepting the ends of the pipe 140. The shield 240 is also shaped appropriately so as to accommodate the outer shell 120 and the pipes 40 and 42. The muffler 60 and the shield 240 are received in a centrally located recess 21a provided in a lower surface of the bumper 21. The pipes 140, 40 and 42 may have any other geometric shape. For example, the pipe 140 may have an S-shape.

Figure 3:
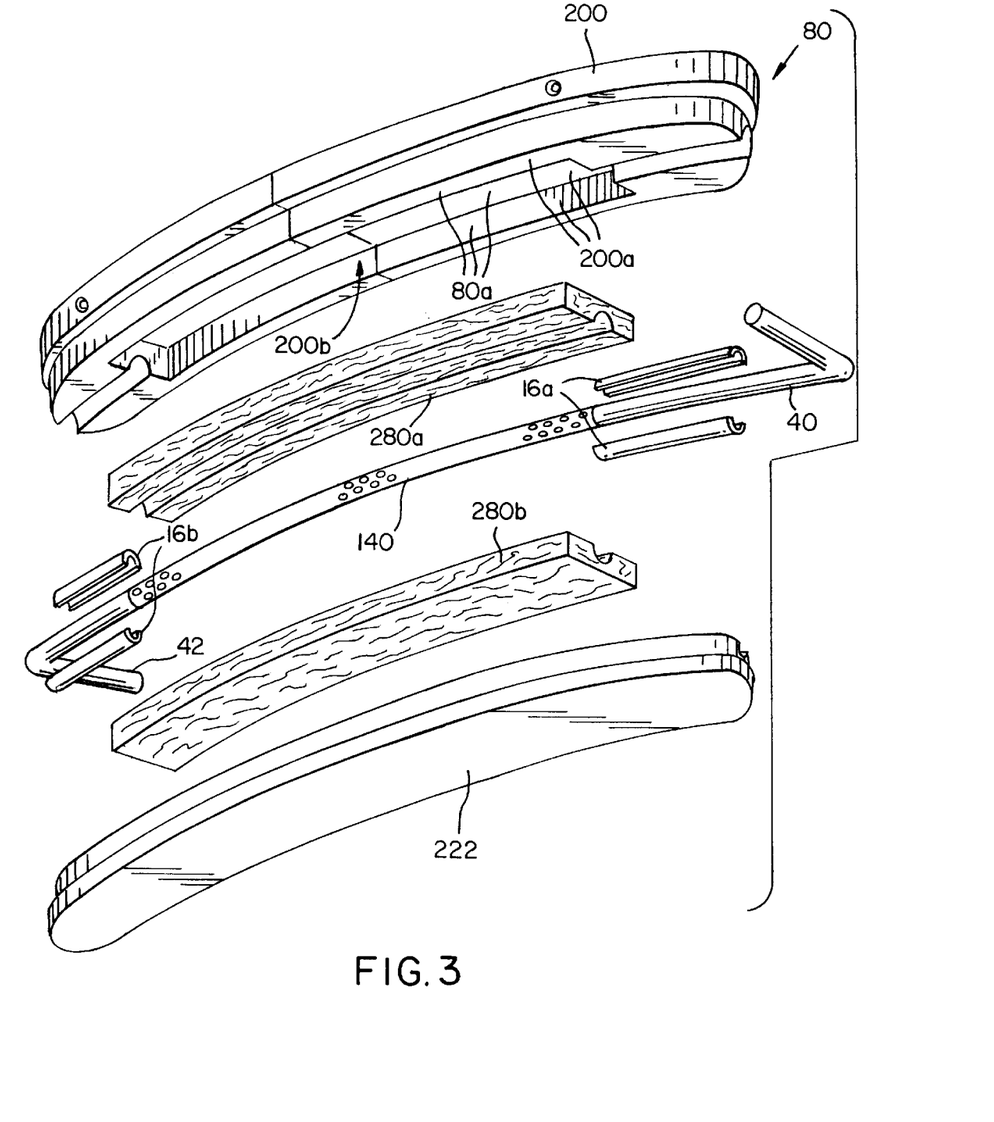
FIG. 3 is an exploded, perspective view of a bumper/muffler assembly constructed in accordance with a third embodiment of the present invention.

A muffler 80, configured in accordance with a third embodiment of the present invention, is illustrated in FIG. 3, wherein like reference numerals indicate like elements. In this embodiment, a first part 80a of the outer shell of the muffler 80 is defined by a portion 200a of the bumper 200. The bumper portion 200a defines a recess 200b for receiving a first fibrous glass material preform 280a which, in turn, receives the perforated pipe 14. A second part of the outer shell of the muffler 80 is defined by a portion of a cover 222. The cover portion includes a recess (not shown) for receiving a second fibrous glass material preform 280b which, in turn, also receives the perforated pipe 14. Accordingly, portions of the bumper 200 define structural components of the muffler 80. Furthermore, the construction of the bumper may permit removal of the cover 222, thereby allowing the muffler to be easily serviced in the event that a component of the muffler, such as a bushing 16a or 16b or pipe 14, requires repair or replacement. In a similar manner, such construction provides for flexibility in manufacturing, as the muffler construction may be modified as desired for a particular vehicle.

Figure 4:
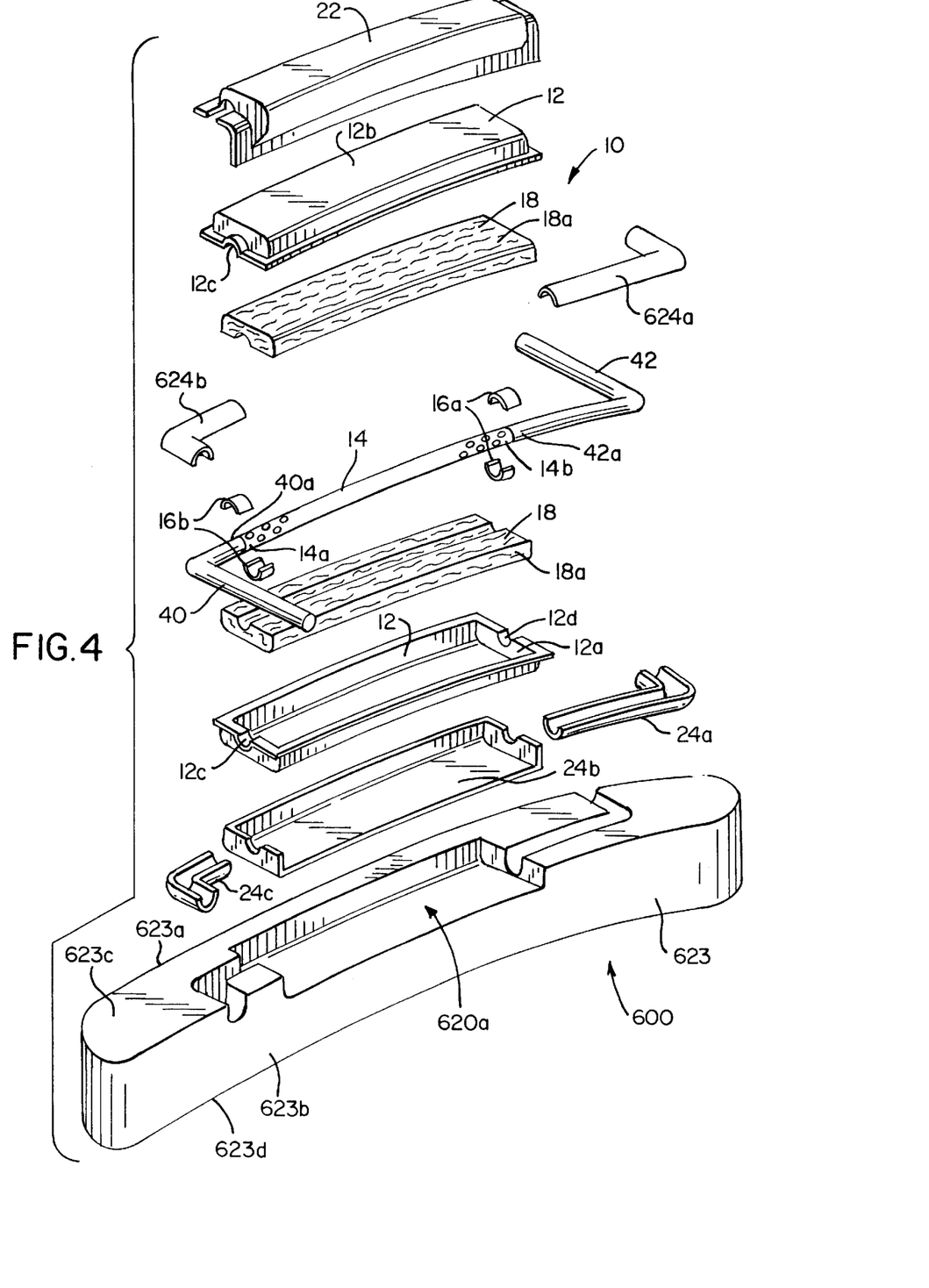
FIG. 4 is an exploded, perspective view of a bumper/muffler assembly constructed in accordance with a fourth embodiment of the present invention.

A muffler 10 and a vehicle bumper 600, constructed in accordance with a fourth embodiment of the present invention, are illustrated in FIG. 4, where like reference numerals indicate like elements. In this embodiment, the muffler 10 is constructed from the same elements and in the same manner as muffler 10 illustrated in FIG. 1.

The bumper 600 comprises a main body 623 having a front surface 623a, a rear surface 623b, an upper surface 623c and a lower surface 623d. The front surface 623a faces away from a vehicle to which the bumper 600 is coupled. The rear surface 623b faces toward the vehicle. The upper surface 623c faces away from ground and the lower surface 624d faces toward ground. The main body 623 further includes a recess 620a formed in the rear and upper surfaces 623b and 623c for receiving the muffler shell 12 such that the main body 623 provides impact protection for the muffler shell 12.

A cover 22 is bolted or otherwise coupled to the bumper 600 so as to secure the muffler 10 to the bumper 600 as well as to provide additional impact protection for the muffler 10. The bumper 600 may be formed from any one of the materials noted above from which bumper 20 is formed.

In the FIG. 4 embodiment, a heat shield 24 comprising first, second and third sections 24a–24c is provided between the muffler 10, portions of the exhaust pipes 40 and 42 and the bumper 600. The heat shield sections 24a–24c are formed from the same materials from which sections 24a–24c, illustrated in FIG. 1 and discussed above, are formed. Further heat shield sections 624a and 624b, which may be formed from the same materials from which heat shield sections 24a–24c are formed, are provided between the vehicle (not shown) and portions of the pipes 40 and 42.

In an alternative embodiment, outer shell part 12a may be formed as an integral part of the bumper 600. The bumper may be formed from a metal in this embodiment. In this embodiment, a shield second section 24b is not provided. A separate outer shell part 12b is provided.

In the embodiments illustrated in FIGS. 1, 2 and 4, all elements of the muffler are separate and distinct from the bumper, i.e., the muffler parts are not integral with any portion of the bumper. This may be advantageous in the event that one or more parts of the muffler become defective or are damaged and need replacing. Replacement of the defective/damaged parts can be more easily effected and the cost of replacement parts most likely will be less expensive in these embodiments than in the case where the replacement part is integral with a larger, and potentially more expensive portion of the bumper.

In each of the embodiments discussed above, the perforated and exhaust pipes may have geometric shapes which differ from those illustrated in FIGS. 1, 1A–1D and 2–4.

What is claimed is:

1. A bumper/muffler assembly comprising:
    a bumper;
    a muffler having an outer shell formed from a composite material, said muffler being associated with said bumper;
    a bushing having an outer surface engaging said outer shell and an inner surface adapted to engage at least one of a perforated pipe and a flex section.

2. A bumper/muffler assembly as set forth in claim 1, wherein said muffler further comprises a perforated pipe for receiving exhaust gases and fibrous material provided within said outer shell between said perforated pipe and said outer shell.

3. A bumper/muffler assembly as set forth in claim 2, wherein said fibrous material comprises a needle felt material.

4. A bumper/muffler assembly as set forth in claim 3, wherein said fibrous material comprises first and second fibrous material preforms which are received respectfully in said first and second shell parts.

5. A bumper/muffler assembly as set forth in claim 2, wherein said fibrous material comprises a loose wool-type product fed into said outer shell via a texturizing device.

6. A bumper/muffler assembly as set forth in claim 2, wherein said muffler shell comprises first and second parts.

7. A bumper/muffler assembly as set forth in claim 2, further comprising a heat shield provided between said bumper and said muffler outer shell.

8. A bumper/muffler assembly as set forth in claim 2, further comprising at least one bushing for holding a portion of said perforated pipe within said outer shell.

9. A bumper/muffler assembly as set forth in claim 2, further comprising a cover for securing said muffler to said bumper.

10. A bumper/muffler assembly as set forth in claim 1, wherein said bumper comprises a main body having front, rear, upper and lower surfaces, said front surface facing away from a vehicle, said rear surface facing toward the vehicle, said upper surface facing away from ground and said lower surface facing toward ground, and said main body including a recess formed in said rear surface and one of said upper and lower surfaces for receiving said muffler shell such that said main body provides impact protection for said muffler shell.

11. A bumper/muffler assembly as set forth in claim 10, wherein a portion of said main body defines at least a part of an outer shell of said muffler.

12. A bumper/muffler assembly as set forth in claim 1, wherein said bumper comprises a main body having front, rear, upper and lower surfaces, said front surface facing away from a vehicle, said rear surface facing toward the vehicle, said upper surface facing away from ground and said lower surface facing toward ground, and said main body including a recess formed in one of said upper and lower surfaces and spaced from said front surface for receiving said muffler shell such that said main body provides impact protection for said muffler shell.

13. A bumper/muffler assembly as set forth in claim 12, wherein a portion of said main body defines at least a part of an outer shell of said muffler.

14. A bumper/muffler assembly as set forth in claim 1, wherein said busing comprises a ceramic bushing.

15. A bumper/muffler/exhaust pipe system comprising:
    a bumper/muffler assembly comprising a bumper, and a muffler having an outer shell and a perforated pipe extending through said outer shell, said muffler being associated with said bumper;
    at least one exhaust pipe;
    a flex section for coupling said exhaust pipe to said perforated pipe; and
    a bushing having an outer surface engaging said outer shell and an inner surface engaging said flex section.

16. A bumper/muffler/exhaust pipe system as set forth in claim 15, wherein said flex section is one of welded and clamped to said exhaust pipe.

17. A bumper/muffler/exhaust pipe system as set out in claim 15, wherein said flex section extends only part way through said bushing and abuts said perforated pipe.

18. A bumper/muffler/exhaust pipe system as set out in claim 15, wherein said flex section extends completely through said bushing.

19. A bumper/muffler/exhaust pipe system as set out in claim 15, wherein said flex section comprises a flexible woven metal tube.

20. A bumper/muffler assembly comprising:
    a bumper; and
    a muffler associated with said bumper including an outer shell and a perforated pipe with opposing ends, said perforated pipe extending through said outer shell, and at least one bushing assembly positioned between said outer shell and said perforated pipe, said bushing assembly including a first bushing having an angled outer surface and being fixedly coupled to said perforated pipe, a second bushing having an angled inner surface and being positioned over said first bushing, said second bushing engaging an inner surface of said outer shell and being capable of moving relative to said first bushing and said outer shell, and a spring fixedly coupled to said perforated pipe and engaging an inner, side surface of said second bushing for biasing said second bushing outwardly toward a corresponding end of said perforated pipe.

21. A bumper/muffler assembly comprising:

a bumper; and a muffler having an outer shell formed from a non-high impact resistant phenolic resin material, said muffler being associated with said bumper; and a bushing having an outer surface engaging said outer shell and an inner surface adapted to engage at least one of a perforated pipe and a flex section.

22. A bumper/muffler assembly as set forth in claim 21, wherein said outer shell does not comprise a high impact-resistant structural component of said bumper.

23. A bumper/muffler assembly as set forth in claim 21, wherein said muffler further comprises a perforated pipe for receiving exhaust gases and fibrous material provided within said outer shell between said perforated pipe and said outer shell.

24. A bumper/muffler assembly as set forth in claim 23, wherein said fibrous material comprises a needle felt material.

25. A bumper/muffler assembly as set forth in claim 23, wherein said fibrous material comprises a loose wool-type product fed into said outer shell via a texturizing device.

26. A bumper/muffler assembly as set forth in claim 23, wherein said muffler shell comprises first and second parts.

27. A bumper/muffler assembly as set forth in claim 26, wherein said fibrous material comprises first and second fibrous material preforms which are received respectfully in said first and second shell parts.

28. A bumper/muffler assembly as set forth in claim 23, further comprising a heat shield provided between said bumper and said muffler.

29. A bumper/muffler assembly as set forth in claim 23, further comprising at least one bushing for holding a portion of said perforated pipe within said outer shell.

30. A bumper/muffler assembly as set forth in claim 23, further comprising a cover for securing said muffler to said bumper.

31. A bumper/muffler assembly as set forth in claim 21, where said non-high impact resistant phenolic resin material comprises a phenol-formaldehyde resin.

32. A bumper/muffler/exhaust pipe system comprising:

a bumper/muffler assembly comprising a bumper, and a muffler having an outer shell and a perforated pipe extending through said outer shell, said muffler being associated with said bumper;

at least one exhaust pipe; and a flex section for coupling said exhaust pipe to said perforated pipe, wherein said flex section extends at least part way into an opening in said outer shell.

* * * * *